United States Patent
Ilyadis et al.

(10) Patent No.: US 10,341,384 B2
(45) Date of Patent: Jul. 2, 2019

(54) NETWORK FUNCTION VIRTUALIZATION SECURITY AND TRUST SYSTEM

(71) Applicant: Avago Technologies International Sales Pte. Limited, Singapore (SG)

(72) Inventors: Nicholas Ilyadis, Merrimack, NH (US); Xuemin Chen, Rancho Santa Fe, CA (US); Philippe Klein, Jerusalem (IL); Ariel Hendel, Cupertino, CA (US); Kumaran David Siva, Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 313 days.

(21) Appl. No.: 14/818,033

(22) Filed: Aug. 4, 2015

(65) Prior Publication Data

US 2017/0012975 A1    Jan. 12, 2017

Related U.S. Application Data

(60) Provisional application No. 62/191,392, filed on Jul. 12, 2015.

(51) Int. Cl.
*H04L 29/06*    (2006.01)

(52) U.S. Cl.
CPC ............. *H04L 63/20* (2013.01); *H04L 63/08* (2013.01); *H04L 63/0876* (2013.01); *H04L 63/102* (2013.01)

(58) Field of Classification Search
CPC ..... H04L 63/20; H04L 63/08; H04L 63/0876; H04L 63/102
See application file for complete search history.

(56) References Cited

U.S. PATENT DOCUMENTS 6,112,228 A * 8/2000 Earl .................... H04L 63/0281
709/203
6,341,311 B1 * 1/2002 Smith ............... G06F 17/30902
707/E17.12

(Continued)

OTHER PUBLICATIONS

Zhang et al ("Zhang," CloudMonatt: an Architecture for Security Health Monitoring and Attestation of Virtual Machines in Cloud Computing, Princeton University, ISCA '15, Jun. 13-17, 2015, ACM, pp. 1-51).*

(Continued)

*Primary Examiner* — Luu T Pham
*Assistant Examiner* — James J Wilcox
(74) *Attorney, Agent, or Firm* — Foley & Lardner LLP

(57) ABSTRACT

A network function virtualization security and trust system includes a network device that operates as a virtualized network device with virtualized services provided on the network device by network nodes included in the system. Security and trust within the system can include hardware authentication of the network nodes and the network device to obtain a level of security of the hardware provisioning the operation of the virtualized services. Security and trust can also include authentication of the services being used on the virtualized network device. Services authentication can be based on monitoring and analysis of the cooperative operation of the services in the virtualized network device. The virtualized services can be dynamically changed, added or stopped. Hardware authentication and dynamic services authentication in accordance with changes in the virtualized services can dynamically maintain a level of security across the devices and the virtualized services.

13 Claims, 5 Drawing Sheets

(56) References Cited

U.S. PATENT DOCUMENTS

| | | | | |
|---|---|---|---|---|
| 6,718,535 | B1* | 4/2004 | Underwood | G06F 9/4443 717/101 |
| 7,788,700 | B1* | 8/2010 | Feezel | G06F 21/31 713/163 |
| 8,275,985 | B1* | 9/2012 | Narayanan | G06Q 50/14 713/150 |
| 8,281,379 | B2* | 10/2012 | Noe | H04L 63/0815 726/10 |
| 8,898,745 | B2* | 11/2014 | Nardone | H04L 63/08 380/277 |
| 9,177,129 | B2* | 11/2015 | Grobman | G06F 21/316 |
| 9,531,542 | B2* | 12/2016 | Barbir | H04L 9/3226 |
| 9,853,974 | B2* | 12/2017 | Hampel | H04L 63/0876 |
| 2003/0018786 | A1* | 1/2003 | Lortz | H04L 41/0893 709/226 |
| 2003/0117944 | A1* | 6/2003 | Donoghue | H04L 12/433 370/216 |
| 2006/0021018 | A1* | 1/2006 | Hinton | H04L 63/06 726/10 |
| 2006/0230167 | A1* | 10/2006 | Watanabe | H04L 43/00 709/230 |
| 2008/0189776 | A1* | 8/2008 | Constable | G06F 21/32 726/7 |
| 2008/0209039 | A1* | 8/2008 | Tracey | H04L 67/2809 709/225 |
| 2009/0150565 | A1* | 6/2009 | Grossner | G06F 9/468 709/241 |
| 2009/0257416 | A1* | 10/2009 | Walker | H04W 8/20 370/338 |
| 2009/0259753 | A1* | 10/2009 | Hinton | H04L 63/0815 709/226 |
| 2009/0320118 | A1* | 12/2009 | Muller | G06F 21/34 726/9 |
| 2011/0066849 | A1* | 3/2011 | Niccolini | H04L 63/0823 713/156 |
| 2011/0314145 | A1* | 12/2011 | Raleigh | H04L 41/0893 709/224 |
| 2011/0314532 | A1* | 12/2011 | Austin | H04L 9/3213 726/8 |
| 2011/0314533 | A1* | 12/2011 | Austin | H04L 63/08 726/9 |
| 2012/0114123 | A1* | 5/2012 | Garcia Morchon | H04L 9/3236 380/270 |
| 2012/0216267 | A1* | 8/2012 | Austel | H04L 9/3234 726/8 |
| 2012/0260182 | A1* | 10/2012 | Hansen | G06Q 10/00 715/736 |
| 2013/0133023 | A1* | 5/2013 | Burstein | G06F 21/00 726/1 |
| 2013/0198811 | A1* | 8/2013 | Yu | H04L 63/08 726/4 |
| 2014/0043965 | A1* | 2/2014 | Tabuchi | H04L 47/11 370/229 |
| 2014/0068106 | A1* | 3/2014 | Turlington | H04L 12/5691 709/241 |
| 2014/0245389 | A1* | 8/2014 | Oberheide | H04L 63/0884 726/3 |
| 2014/0380427 | A1* | 12/2014 | Srinivasan | H04L 63/08 726/4 |
| 2015/0082304 | A1* | 3/2015 | Hepkin | G06F 21/53 718/1 |
| 2015/0263855 | A1* | 9/2015 | Schulz | H04L 9/0827 713/155 |
| 2015/0294123 | A1* | 10/2015 | Oxford | G06F 21/78 713/193 |
| 2015/0304327 | A1* | 10/2015 | Burstein | G06F 21/00 726/1 |
| 2015/0319176 | A1* | 11/2015 | Yahalom | G06F 21/31 726/3 |
| 2016/0028728 | A1* | 1/2016 | Hampel | H04L 63/0876 713/156 |
| 2016/0036855 | A1* | 2/2016 | Gangadharappa | H04L 63/20 726/1 |
| 2016/0080380 | A1* | 3/2016 | Dawoud Shenouda Dawoud | H04L 63/0876 713/156 |
| 2016/0099853 | A1* | 4/2016 | Nedeltchev | H04L 69/28 370/253 |
| 2016/0182458 | A1* | 6/2016 | Shatzkamer | H04L 63/0428 713/168 |
| 2016/0219076 | A1* | 7/2016 | Paczkowski | G06F 9/45558 |
| 2016/0366185 | A1* | 12/2016 | Lee | H04L 63/20 |
| 2017/0041201 | A1* | 2/2017 | Ilyadis | H04L 43/08 |

OTHER PUBLICATIONS

Li-Trust Model to Enhance Security and Interoperability of Cloud Environment, CloudCom 2009, LNCS 5931, pp. 69-79, 2009, Springer-Verlag Berlin, Heidelberg.*

Sun-A Trust Management Model to enhance security of Cloud Computing Environments, 2011 Second International Conference on Networking and Distributed Computing, 2011, IEEE, pp. 244-248.*

Kanwal-Evaluation and Establishment of Trust in Cloud Federation, IMCOM, Jan. 9-11, 2014, ACM, pp. 1-8.*

Khanna-Distributed Cloud Federation Brokerage: A Live Analysis, 2014, IEEE/ACM 7th International Conference on Utility and Cloud Computing, pp. 738-743.*

* cited by examiner

NETWORK FUNCTION VIRTUALIZATION SECURITY AND TRUST SYSTEM

PRIORITY CLAIM

This application claims priority to U.S. provisional patent application Ser. No. 62/191,392, filed Jul. 12, 2015, which is entirely incorporated by reference.

TECHNICAL FIELD

This disclosure relates network function virtualization systems, and more particularly to network function virtualization security and trust systems.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high speed data networks have emerged and matured, and now form part of the backbone of what has become indispensable worldwide data connectivity, including connectivity to virtual machine hosts. Improvements in virtualization will drive the further development and deployment of virtualization functionality.

DETAILED DESCRIPTION

Figure 1:
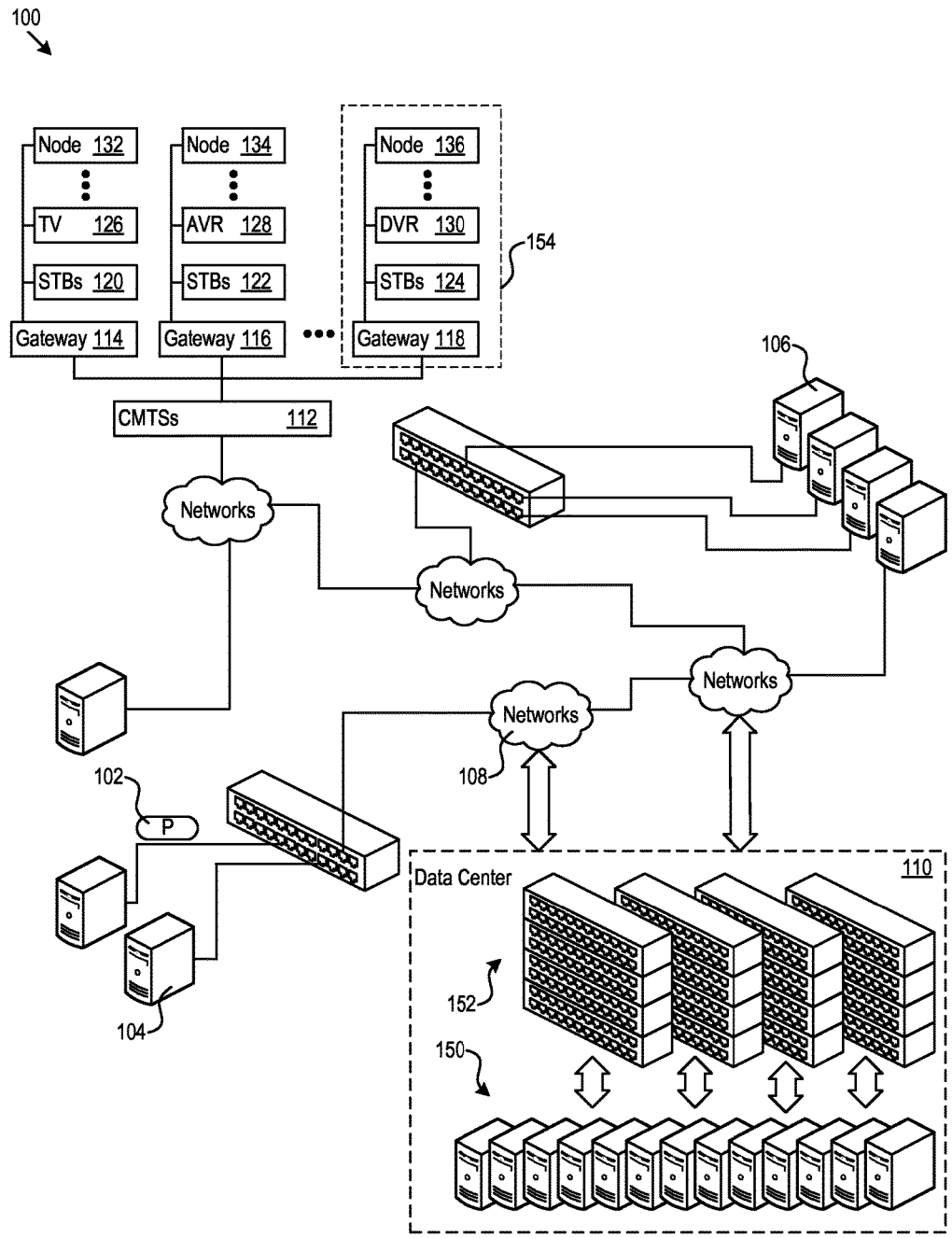
FIG. 1 shows an example of a network that includes virtual machine hosts connected by network devices.

FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server computer installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 154, such as homes, offices, schools, and government buildings. The network 100 may include other types of termination systems and gateways. For example, the network 100 may include digital subscriber line (DSL) termination systems and DSL modems that function as the entry points into homes, offices, or other locations.

At any given location, a gateway may connect to any number or any type of node. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players 132, gaming systems 134, computer systems 136, and physical media (e.g., Blu-Ray®) players, and/or any other form of media device. The nodes may represent any type of customer premises equipment (CPE).

Figure 2:
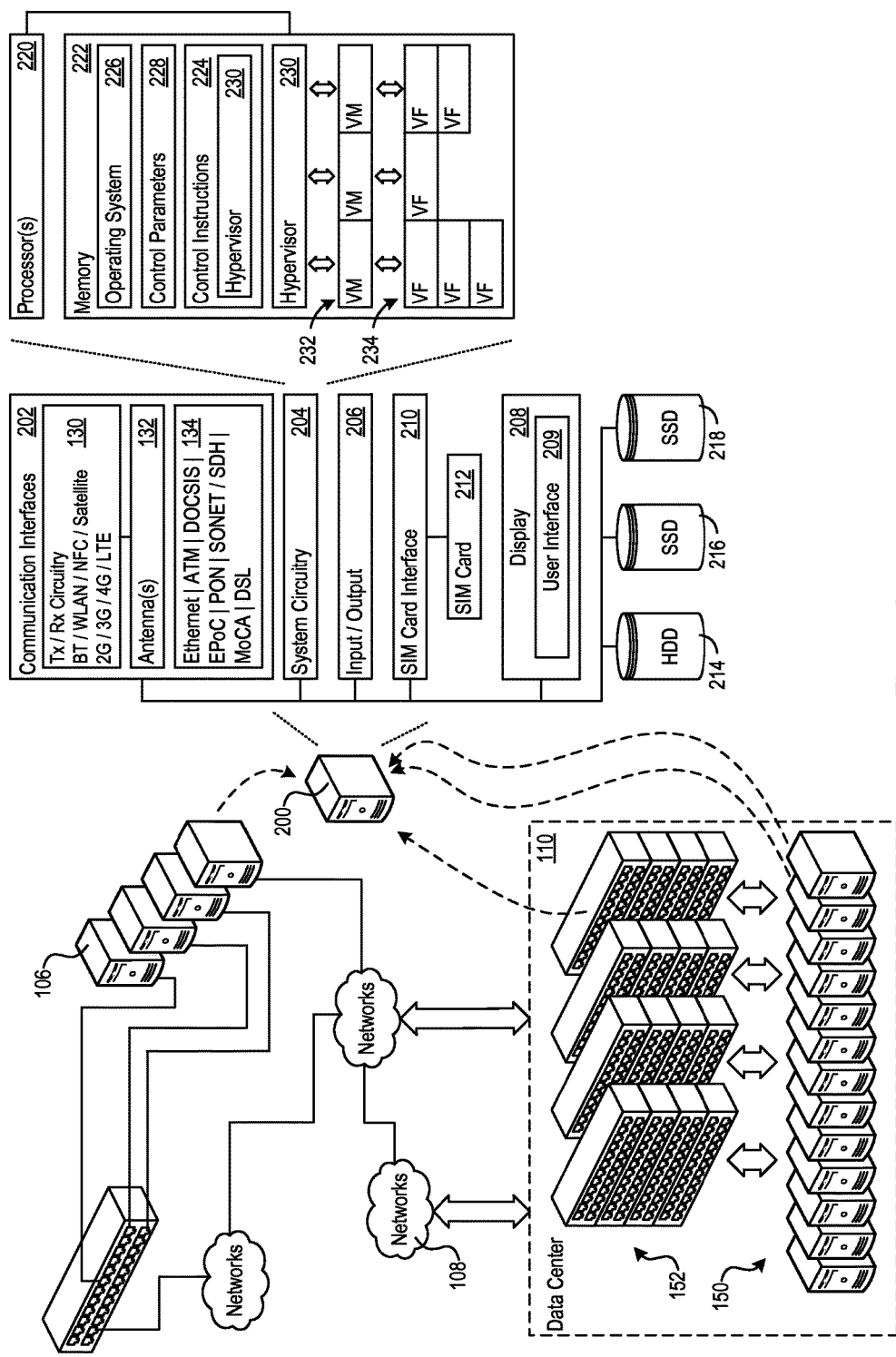
FIG. 2 shows an example of a virtual machine host configured to execute virtual machines and virtual functions.

FIG. 2 shows an example of a virtual machine host 200 ("host") configured to execute virtual machines and virtual functions in the form of services. Any of the devices in the network 100 may be hosts, including the nodes, gateways, CMTSs, switches, server computers, sources, and destinations. The hosts provide an environment in which any selected functionality may run, may be reachable through the network 100, and may form all or part of a chain of functionality to accomplish any defined processing or content delivery task. The functionality may be virtual in the sense that, for example, the virtual functions may be implemented, as hardware that includes execution of software instances running on the hosts, functions or services that were in the past executed with dedicated hardware or software.

In FIG. 2, the host 200 includes one or more communication interfaces 202, system circuitry 204, input/output interfaces 206, and a display 208 on which the host 200 can generate a user interface 209. When the communication interfaces 202 support cellular connectivity, the host 200 may also include a SIM card interface 210 and a SIM card 212. The host(s) 200 can also include storage devices, such as hard disk drives 214 (HDDs) and/or solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, running virtual functions, routing packets between the virtual machines and the network 100, and switching packets between virtual machines.

As an example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out at least a portion of any desired functionality for the host 200. The control parameters 228 provide and specify configuration and operating options for the control instructions 224, operating system 226, and other functionality of the host 200.

In some implementations, the control instructions 224 include at least some functionality of a hypervisor 230. The hypervisor 230 also includes circuitry that provides hardware operated within a supervising environment to execute one or more virtual machines (VMs), virtual switches, virtual firewalls, virtual operating systems, virtual network interface cards (NICs), or any other desired virtualization components operable as different services for one or more network devices. In other implementations, the host 200 is a bare-metal virtualization host. That is, the host 200 need not execute a separate operating system 226 on top of which the hypervisor 230 operates. Instead, the hypervisor 230 may directly communicate with and control the physical hardware resources in the host 200 without supervision or intervention through a separate operating system.

The host 200 may execute any number of VMs 232. Each VM may execute any number or type of virtual functions (VFs) 234. The VFs may be implementations of any desired functionality, ranging, for instance, from highly specialized network functions to general purpose processing functions.

As just a few examples of network functions or services, the VFs 234 may include circuitry implementing network firewalls, messaging spam filters, and network address translators. As other example of processing functions or services, the VFs may implement audio and video encoders and transcoders, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs include audio, video, and image compression and decompression, such as H.264, MPG, and MP4 compression and decompression; audio and video pre- and post-processing, server computer functionality such as video on demand server computer(s), DVR server computer(s); over the top (OTT) server computer(s); secure key storage, generation, and application, and 2D and 3D graphics rendering.

Figure 3:
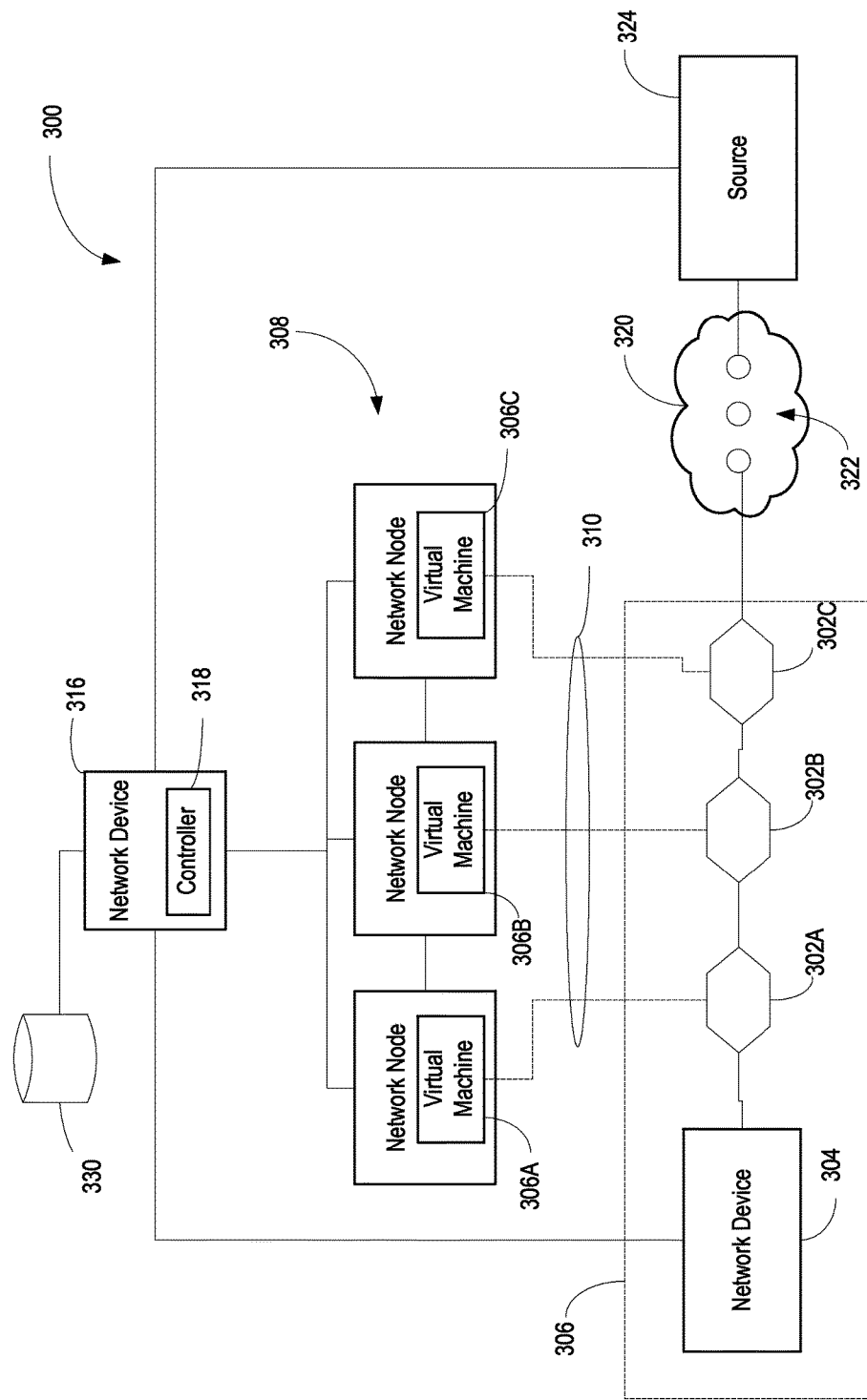
FIG. 3 is a block diagram of a network implementing a system having a number of virtualized services in a network device.

FIG. 3 is a block diagram of a network 300 implementing a system having a number of virtualized services 302 in a network device 304. In FIG. 3, the services 302 and the network device 304 are included in a dotted line box to illustrate that the services 302 cooperatively operate in the network device 304 to provide functionality of the network device 304 as a virtualized network device 306. For example, a first service 302A may provide firewall functionality for the network device 304, a second service 302B may provide decoding functionality for a first protocol, such as video processing, within the network device 304, and a third service 302C may provide decoding functionality for a second protocol, such as audio decoding, within the network device 304. The services 302 may be chained within the network device 304 to form a federation of services that cooperatively operate in the network device 304 to provide the functionality of the network device 304 without the network device 304 having to host and execute each of the services 302. Accordingly, resources within the network device 304 can be less than what would be available to execute dedicated resident services. In addition, different services can be dynamically instantiated in the network device 304 in accordance with the operational demands of the network device 304. For example, if the network device 304 is decoding only audio, the third service 302C, such as for audio decoding, may be instantiated and operational, whereas the second service 302B, such as for video decoding, can be omitted from the service chain.

The different services instantiated in the network device 304 may be provided by one or more virtual machines (VMs) 306 operating on one or more other network nodes 308 in the network as illustrated by the dotted lines 310 in FIG. 3. The network nodes 308 can be characterized as being present in a lower layer, or first layer of the system. One or more other network devices 316 may be included in an upper layer, or second layer of the system to perform a managerial function. The managerial network device(s) 316 may include system circuitry that can be referred to as a controller 318. The controller 318 can include a processor and memory and other hardware, such as the previously discussed hypervisor circuitry, which can provide oversight and management of the system. In addition, the controller 318 may provide security and trust within the chain or federation of services being provided as functional operation of the network device 304. Accordingly, among other functionality, the managerial network device 316 can operate as an authentication server computer involved in hardware authentication using authentication circuitry, services authentication, application authentication (such as DRM), or any combination. The functionality of the authentication server can include functionality similar in at least some respects to a remote authentication dial-in user service (RADIUS) server or an authentication, authorization and accounting (AAA) server.

In the illustrated example, the virtualized network device 306 communicates over one or more networks 320, and through any number of network devices 322, such as switches and routers, with a source 324. The source 324 may be a data source, a content source, a network source, or any other system or device capable of providing desired information or communication pathway with which the network device 304 wishes to communicate. For example, the source 324 may be a video content provider that provides streaming video content under a digital rights management (DRM) regime.

To implement security and trust in virtualized networks, such as the network 300, devices within the network that are part of a federation of services should be authenticated. As used herein, a federation of services is a group of virtual functions or services that cooperatively operate to provide functionality in a network device. Authentication may involve confirmation that each service is what it appears to be. In addition, the integrity of communication should be securely maintained during operation of the federation of services. Implementation of security and trust in virtualized networks will assist in the prevention of unauthorized entities being included in the federation, prevent unauthorized modification of packets and/or data, and maintain data securely.

Network virtualization may include multiple middle nodes between the virtualized network device 306, such as a client device, and a source 324, such as a single secure data center. These middle nodes, or intermediate nodes should be secure and trusted to maintain the integrity of operation of the virtualized network device 306 and the source 324. This is different from operation with traditional data centers where a level of security can be maintained completely within the data center. In the present scenario, a virtualized trusted platform can be created where the security level is consistently maintained at or above an established level across all nodes in the network that are participating in the federation of virtualized services. Establishment and coordination of the level of security and trust can be managed by the managerial network device 316 alone, in conjunction with the network device 304, the network nodes 308, the network devices 322 and/or the source 324, or entirely by the one or more of the network device 304, the network nodes 308, the network devices 322 and/or the source 324.

Since the virtualized network device 306 can include multiple services and multiple devices, and network communication may pass through multiple nodes, such as routers and switches in the network, there are multiple middle nodes between the network device 304 and the source 324, such as the network nodes 308, the managerial network device 316, and the network devices 322. In some example implementations, secure tunneling, such as using a VPN connection may be used to secure a portion, or the entire communication path, however, such tunneling can have little effect on the trust and security of the hardware and services being used in the virtualized network device 306. Alternatively, or in addition, each of the devices in the communication path may be verified as to security and trusted along with those devices supporting the virtual services. Verification of the secure operation of the federation of virtualized services at a level of trust appropriate for the functionality being provided can be dynamically performed by the controller 318 across multiple devices, by multiple network devices, or by individual network devices. Thus, there can be at least two levels of authentication: a first level being a hardware based identity authentication (hardware authentication), and a second level being a services authentication.

Authentication of the hardware or users, such as computer servers, can be performed with the network nodes 308, using the controller 318, the virtualized network device 306, the source 324 and/or the network devices 322. The network devices may operate autonomously or as an authentication server to perform hardware authentication. Such hardware authentication may involve user authentication, certificates, password authentication protocol (PAP), challenge handshake authentication protocol (CHAP), extensible authentication protocol (EAP), two factor authentication (name/password), public and private keys, or any other form of hardware/user authentication that confirms that each piece of hardware/user used to provide part of a service is the hardware/user it purports to be.

To achieve a level of security and trust within a federation of services, trusted service chaining can be implemented following hardware authentication of the various network devices used to implement the federation of services. In such services authentication, a trusted chain of services can be implemented across multiple devices/nodes with an appropriate trust level for the services being provided. For example, the trust level among devices/nodes in a trusted chain of services for the functionality of performing internet browsing with the virtualized network device 306 can be significantly different than the trust level for performing financial transactions with the virtualized network device 306. Correspondingly, the level of both hardware authentication and services authentication can be varied, with a more robust authentication being performed for more security sensitive operation with virtualized services, such as banking, and a relatively low level of authentication being performed for lower security sensitive activities such as internet browsing or social media. In some examples, different federations of virtualized services may be implemented in accordance with the security level. For example, virtual services to provide secure tunneling, or additional layers of authentication may be dynamically initiated in accordance with the trust level of the trusted chain of services.

Within the dynamically varying environment, the security and trust of the federation of services can be dynamically varied as different services are added and removed from the federation to meet the desired functionality of the virtualized network device 306. Implementation of different levels of trust and dynamic movement between the different security levels can occur as more or less security is needed. Since the service(s) can span multiple segments the system can provide a secure environment/envelope in which any number of different services can be instantiated for use on the virtualized network device 306. In addition, services may be dynamically implemented and removed from the virtualized network device 306 as the operational needs and corresponding trust level of the trusted chain of services of the virtualized network device change.

Security and trust can be achieved among the virtualized services by a variety of mechanisms using functionality within, for example, the managerial network device 316, such as the controller 318 operating as a hypervisor or an authentication server with authentication circuitry. In an example of the network device 304 desiring to stream a video from a content provider, DRM functionality to confirm that the network device is authorized to receive the content can be managed by the controller 318. In addition, one or more services that are instantiated in the network device 304, such as decoding, etc., to enable the streaming of video can be dynamically discovered, authenticated and authorized using the controller 318. Alternatively, or in addition, other network devices, such as the network device 304, the network nodes 306, the network devices 322, and/or the source 324 may operate (individually or cooperatively) as an authentication server to dynamically create a trusted chain of services at the appropriate trust level for the given configuration of virtualized services.

Discovery of the service(s) that are to be used in the virtualized network device 306 may be performed by the controller 318 based on predetermined services information stored in a database 330. Such information may provide the details of the services being dynamically instantiated in the virtualized network device 306. In addition, parameters related to different configurations of the virtual services being dynamically instantiated in the virtualized network device 306 can be stored as predetermined services information. Alternatively, or in addition, the managerial network device 316 may communicate with the network device 304, the network nodes 308 and/or the source 324 to discover the service(s) being dynamically deployed and the corresponding predetermined services information.

In addition, the controller 318 may be used to perform services authorization of the federation of services once the trusted chain of services is created by verification of the integrity of the cooperative operation of the services being used in the virtualized network device 306. Alternatively, or in addition, individual network devices, such as the virtualized network device 306, the network nodes 308 and/or the network devices 322 may be used to perform services authorization.

In an example, services authorization by verification of integrity of the cooperative operation can involve storage of predetermined parameters representative of cooperative operation of the virtual services being combined in a virtualized network device. The predefined parameters can represent an expectation of cooperative operation of the virtual services once a relationship between the virtualized services is formed. For example, a predetermined latency threshold may be included as one of the predefined parameters which defines an acceptable time period in which a determined interaction may occur between two or more virtualized services. If the determined interaction takes a longer period of time than the predefined latency threshold, appropriate action may be taken.

In another example, the predefined parameters may include a predetermined rate limit, such as a rate threshold or a rate window, in which one or more of the virtualized services may operate. The rate limit may be, for example the rate traffic is sent and received via a virtualized service related to a network interface controller, the rate of at which a virtualized service makes calls to a database or other resource, the rate at which a virtualized service makes requests to other virtualized services, or the rate of any other repetitive function performed by cooperative operation of the virtualized services in a particular federation that can be tracked and compared to a predefined rate limit.

In other examples, predefined parameters based on instrumenting of data or other parameters of virtualized services may be used to monitor for corresponding expected cooperative operation once relationships have been created between virtualized services. Expected operational characteristics (such as bandwidth consumption) for one or a combination of the virtualized services may be established as parameters. Cooperative operation of the virtual services may be used to monitor the operation of the virtualized services in the network to determine whether the virtualized services are operating as expected or, for example, have been hijacked and turned into a spambot. In response to unexpected operational characteristics being identified within one or more of the virtualized services all or a portion of the virtualized services may be shutdown, controlled, and/or limited. Alternatively, in response to variations away from expected behavior, the trust level of a function/element, such as a network device, may be changed. The trust level may determine whether a particular virtualized service remains in the trusted service chain. A service chain affected by unexpected operation of virtualized service within the service chain may adapt by sending traffic to an alternate function that takes the place of the questionable function/element.

In other examples, creation and maintenance of a trusted chain of services may be based on a dynamic hash. Parameters from each of the virtualized services in a particular federation configuration may be gathered in an authentication function, such as a secure accumulated hash function, or digest, to confirm cooperative operation of the virtual services. For example, hash values, or messages, may be contributed to a hash sum as the hash sum is cascaded through a number of different virtualized services operating in one or more network devices with the resulting hash sum being compared to a predefined hash sum representative of the particular federation of the services currently being dynamically implemented. Since the virtualized services can be in different network devices, the hash sum may be communicated over the network to different network devices 308 that include virtual machines 306 providing functions or services within the federation. The predefined hash sum can be accessible to a network device, such as the managerial network device 316, or the virtualized network device 306, or one of the network nodes 308 to perform the comparison with the hash sum accumulated among the services. In an example implementation, a number of secure accumulated hashes may be cascaded through the virtual machines 306.

Each secure cascaded accumulated hash may accumulate different hash values, which are then combined to form one or more hash sums. The secure accumulated hash function, which is the hash sum, can be confirmed against a predetermined hash function representative of some portion or all of the federation of services. In this way, any particular one of the secure accumulated hashes cascades through the different virtual services in an efficient manner without significantly burdening the operational performance of the respective virtualized services. Cascaded hashes may also occur at different layers, such as at the first layer among the network nodes 308, or at the second layer among managerial network devices 316, or some combination.

There may be any number of predetermined hash functions in accordance with different combinations of the virtualized services that contribute to one or more of the hash sums. The particular predetermined hash function may be chosen by the managerial network device 316 based on the services presently active on the virtualized network device. Alternatively, or in addition, the secure accumulated hash function may include an active virtual services indication that is accumulated as the hash cascades to indicate the virtualized services that have contributed hash values to the secure accumulated hash function. Thus, the virtualized network device 306, or another network device may read the active virtual services indication in a given hash sum, and select a corresponding predetermined hash function for comparison.

In another example, services authentication may be based on the cooperative operation of a number of network devices to develop a trusted chain of services based on a predetermined stored template of cooperative operation parameters. Each of the devices forming part of the chain of virtualized services may be instrumented in such a way so as to detect whether the cooperative operation of the services is occurring as expected. Thus, as the virtualized service interacts and evolves, various parameters may be verified as being within an expected range. For example, unexpected deviations in traffic patterns may be identified as potential rogue operation of a virtualized service within a trusted chain of services.

The network devices 322 may also dynamically validate the devices (hardware authentication) providing virtual services. In an example, a trust operation may be dynamically cascaded through a chain of devices, such as the network nodes 308, providing the virtualized services. In addition, a dynamically cascading trust operation may be performed among other network devices involved in supporting the virtualized services, such as the network device 304, the network devices 322, the source 324 and/or the managerial network device 316.

As the federation of virtual services changes, different hardware, such as network nodes 308, may be providing different virtual machines 406 to provide functions or virtual services. In an example scenario, the network device 304 may hardware authenticate one of the network nodes 308, such as the network node 308 providing the virtual machine 306A. Hardware authentication of the network node 308 may be accomplished by, for example, certificates, password authentication protocol (PAP), challenge handshake authentication protocol (CHAP), extensible authentication protocol (EAP), two factor authentication (name/password), public and private keys, or any other form of hardware authentication.

The network node 308, such as the network node 308 providing the virtual machine 306A, once hardware authenticated, may similarly hardware authenticate a network device 322, such as a network switch, used to communicate with other of the network nodes 308. The network switch, once hardware authenticated, may hardware authenticate one or more of the network nodes 308, such as the network node 308 providing the virtual machine 306B. The network node 308 providing virtual machine 306B, once hardware authenticated may in turn hardware authenticate the network node 308 providing the virtual machine 306C using a similar form of hardware authentication. The network node 308 providing the virtual machine 306C may then authenticate the network device 304, for example.

This form of hop-by-hop validation of the identity of the network devices forming the virtualized services and/or the communication path for the virtualized network services does not require any particular device to know, manage or oversee hardware authentication of all the other devices forming part of the federation of virtualized services. Instead, each device can include authentication information for neighboring devices that allows dynamic hardware authenticate of its neighboring communication devices using hardware authentication techniques. Using this form of hop-to-hop hardware authentication technique, the entire chain of devices can be hardware authenticated to form one or more trusted chains of devices. Thus, the managerial network device 316 may or may not need to know all the communication paths of the devices. Instead, the individual devices can perpetuate a cascaded hardware authentication of each other using hop-by-hop hardware authentication to validate that each of the hardware devices providing at least part of the virtualized services are who they indicate they are. By creating a cascaded trust relationship among the network devices, all the devices along the communication path may be hardware validated as so as to establish and maintain a minimum security level of hardware authentication.

Figure 4:
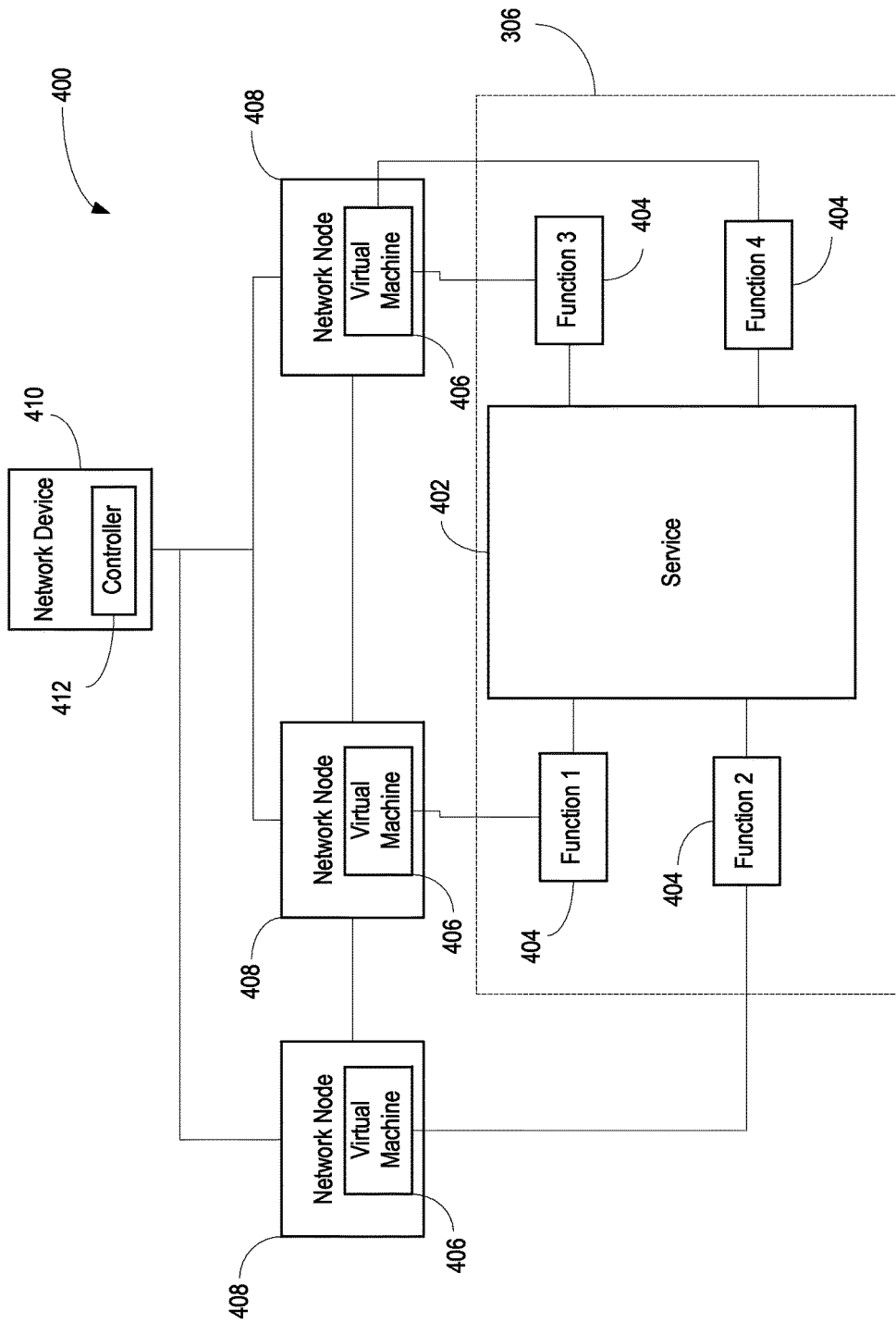
FIG. 4 is a block diagram illustrating an example of a service 402 being supported by a number of functions 404 in an example system.

FIG. 4 is a block diagram illustrating an example of a service 402 being supported by a number of functions 404 in an example system 400. Each of the functions 404 can be provided by virtual machines 406 instantiated in one or more network nodes 408. The functions may cooperatively operate to provide the service 402. In this example, hardware authentication of each of the network nodes 408 may occur using a managerial network device 410 that includes controller circuitry 412 and operates as an authentication server using authentication circuitry, or can be performed by hop-by-hop authentication by iterative verification among the network devices 408.

Upon completion of the hardware identity authentication to form a trusted chain of devices performing the virtualized services, cooperative operation of the functions 404 can be used to create the trusted chain of services, such as by using a predetermined stored template of expected cooperative operation parameters. For example, a network device, such as a network interface card (NIC), may include a template indicating a mapping of the virtual machines providing functions 404 of the virtualized services, and which can indicate how the virtual machines are connected. In addition, in an example configuration, a network device may include a network interface card (NIC) or network interface circuitry, which may be instrumented to monitor operational parameters related to the cooperative operation of the functions of virtualized services in a particular federation and compare these monitored parameters to template parameters, such as the frequency of packets entering and leaving a network device, or one of the functions 404, due to the configuration of virtualized services presently operating.

In another example, one or more different network devices may dynamically gather historical operational data of the functions 404 or the service 402, such as packet traffic frequency, to develop a historical average for each of a number of different particular configurations of virtualized services. The historical averages for a given configuration of virtualized services may be used as a threshold to trigger some form of alarm or reactive operation when the parameters go outside the historic average, since this can indicate some form of rouge virtual service is occurring as part of the cooperative operation.

In this scenario, since dynamic monitoring of cooperative operation involves parameters from two or more virtualized services, such monitoring may occur using, for example a hypervisor in the managerial network device 410 and a dynamically updated template in the database 330 to compare expected communication/operation with actual communication/operation among the virtualized services 402 or functions 404. Alternatively, or in addition, one or more other network devices, such as the virtualized network device 306, a switch, or a router may be instrumented to dynamically monitor cooperative operation of different federations/configurations of virtualized services using a predefined or dynamically updated template of parameters for that particular federation.

For a given configuration of virtualized services, expected cooperative operation, such as a traffic pattern, may be monitored. Monitoring of different functions 404 or services 402 may be based on identification of the different services/functions so that parameters associated with each particular function or service may be identified and separately monitored. In an example, memory blocks in a shared memory may be allocated to different functions 404 or services 402 so that the memory blocks may be used to separately identify a virtualized service or functions within a virtualized service. In this example, packets may be poured in the shared memory and monitored for comparison to determined parameters. Such memory mapping and monitoring may be hardware based or a combination of hardware and software based.

Figure 5:
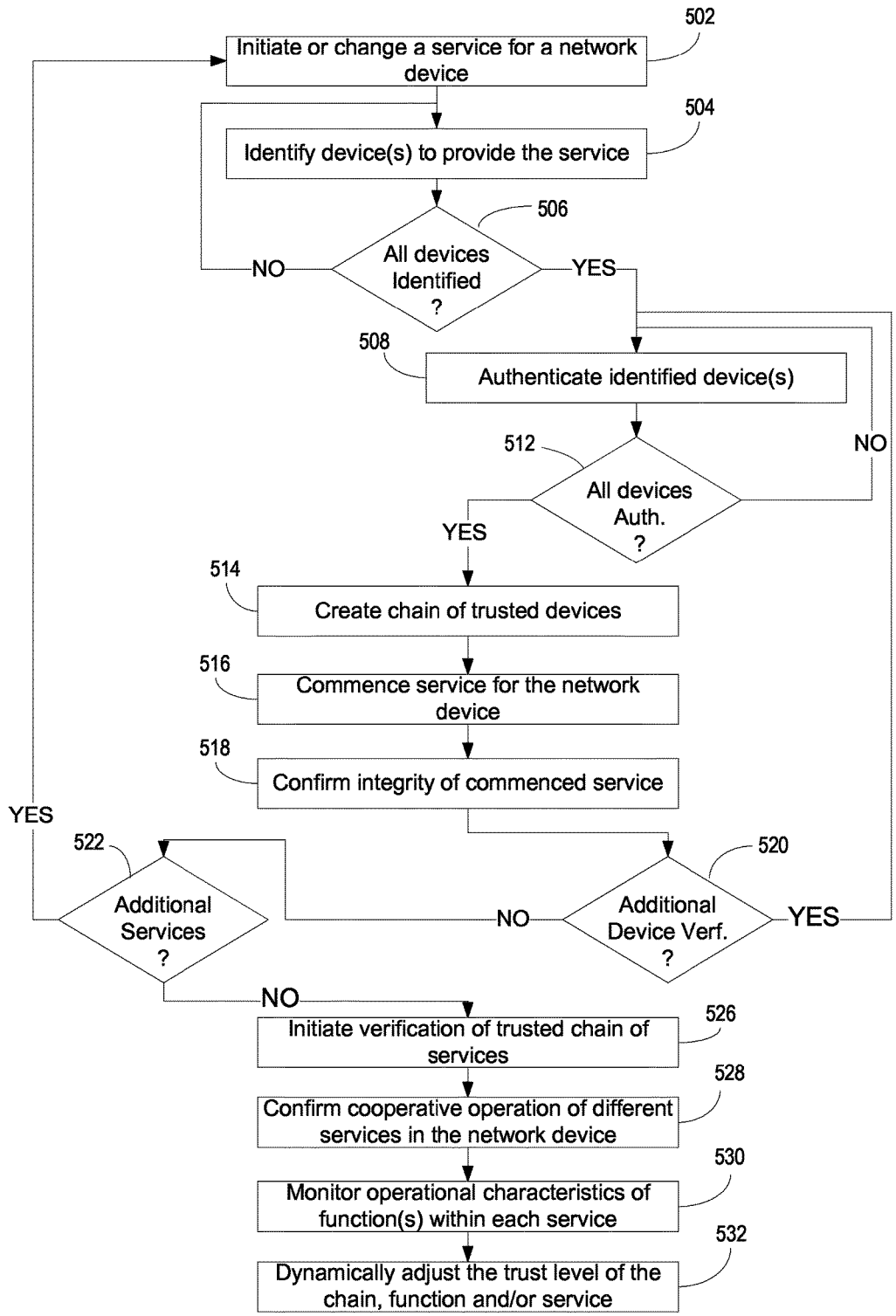
FIG. 5 is an example operational flow diagram illustrating performance of security and trust in a system implementing virtualized services.

FIG. 5 is an example operational flow diagram illustrating performance of security and trust in a system implementing virtualized services. With reference to FIGS. 1-4, a network device 304 may perform an operation that includes initiation or changes to a service 402. (502) In this example, initiation or change of a service 402 is described singularly, however, any number of services 402 may be dynamically changed, initiated or stopped during operation of the network device 304. In addition, in this description change, initiation and stopping of services 402 are described, it should be recognized that change, initiation and stopping of functions 404 is also performed. The virtualized service 402 may be identified along with the network device(s) supporting the virtual machine(s) providing the identified virtualized service. (504) If there is a number of network devices, such as network nodes 306, 406, each of the devices supporting the service 402 (or functions 404 within the service 402) may be identified, until all the associated devices are identified. (506) Hardware authentication of the network devices may then be performed, such as by hop-to-hop hardware authentication, managerial device hardware authentication, network device hardware authentication, or some combination thereof. (508) All of the changes to the hardware supporting the changes in the virtualized service 402 can be confirmed as having been verified, and if not, additional hardware authorization can be performed. (512)

A chain of trusted devices can then be established that includes any existing devices already providing/supporting the virtualized services 402 and/or communication with the virtualized network device 306, along with the newly hardware authenticated network devices. (514) Thus, in this example, additional network devices may be added to the trusted chain of devices once they are confirmed as being the device they advertised. In other examples, the entire chain of trusted devices may be re-established, or some portion of the trusted chain of devices (previously hardware authenticated or not) may be hardware authenticated.

Once the hardware authentication is complete, the service 402 may be commenced at the virtualized network device 306 using the virtual machine(s) 306 operable in the network node(s) 308. (516) As part of commencement of the service or function, the integrity of the service or function can be verified. (518) Verification of integrity of the commenced services may include confirmation that the service is being provided by network devices from the chain of trusted devices, and that all devices have been hardware authenticated to a level of security appropriate for the service being commenced. Accordingly, existing devices in the chain of trusted devices may need additional hardware authentication due to a higher level of security associated with the service being commenced. (520) It can be confirmed that there are no other new additional services 402. In addition, any other service affected by the addition, change of a service can be similarly authenticated. (522)

Once the hardware authentication is complete, and the integrity of the commenced service has been confirmed, verification of the trusted chain of services may be initiated by performing service authentication. (526) Service authentication can include monitoring parameters, hash functions, or any other mechanism to authenticate the integrity of the cooperative operation of the virtual services 402 presently supporting the virtualized network device 306 to create a chain of trusted services. (528) Dynamically monitoring operational characteristics of the functions 404 within each of the services 402 during cooperative operation of the functions 404 and/or services 402 may be performed. (530) The chain of trust, the trust level of the service 402 and/or function 404 may by dynamically adjusted in accordance with the operation of the virtualized network device 304. (532)

Management of the trusted chain of devices and the trusted chain of services may be performed by the managerial network device 316, the network device 304, the network nodes 308, the network devices 322, source 324, or some combination of two or more of these devices. In examples of operation, hardware authentication and services authentication may be triggered by predetermined events, such as a change or addition to a service 402. Alternatively, or in addition, hardware authentication and services authentication may be an ongoing process running in the background of operation of the virtualized network device 306.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A system comprising:
an authentication server to authenticate an identity of a first network device and a second network device, the first network device executed to provide a first service for a third network device, and the second network device executed to provide a second service for the third network device, wherein the first service and the second service are provided over a network to the third network device, wherein the authentication server is configured to:
   initiate authentication of the identity of the first network device, the second network device, and the third network device, to create a chain of trusted devices in response to the third network device being initiated to operate using the first service and the second service before an integrity of the chain of trusted devices is verified, wherein the initiation of the authentication of the identity of the first network device and the second network device comprises a two factor authentication by the authentication server,
   receive an accumulated hash from the first network device, the accumulated hash sequentially built by cascading a hash sum through the second network device and the first network device,
   compare the accumulated hash against a predetermined hash representative of cooperative operation of the first service and the second service in the third network device,
   verify the integrity of the chain of trusted devices based on the comparison of the accumulated hash against the predetermined hash and by comparing monitored parameters in the third network device related to the cooperative operation of the first service and the second service with predetermined parameters of a federation of the first service and the second service, and
   dynamically adjust a level of the first service and the second service according to verification of the integrity of the chain of trusted devices.

2. The system of claim 1, wherein the first network device and the second network device provide the first service and the second service, respectively, over the network as part of operational functionality of the third network device.

3. The system of claim 1, wherein the initiation of the authentication of the identity of the first network device and the second network device comprises authentication of the first network device with the authentication server, and authentication of the second network device by the first network device.

4. The system of claim 1, wherein the cooperative operation of the first service and the second service is confirmed by the authentication server based on a predetermined stored template of cooperative operation parameters.

5. The system of claim 1, wherein the authentication server dynamically retrieves another predetermined stored template of cooperative operation parameters in response to a change of the first service or the second service, or addition of another service to the first network device or the second network device.

6. A method of authenticating an identity of a first network device and a second network device, the first network device executed to provide a first service for a third network device, the second network device executed to provide a second service for the third network device, the first service and the second service provided over a network to the third network device, the method comprising:
   initiating authentication of the identity of the first network device, the second network device, and the third network device, to create a chain of trusted devices in response to the third network device being initiated to operate using the first service and the second service before an integrity of the chain of trusted devices is verified, wherein the initiation of the authentication of the identity of the first network device and the second network device comprises a two factor authentication by an authentication server;
   receiving an accumulated hash from the first network device, the accumulated hash sequentially built by cascading a hash sum through the second network device and the first network device;
   comparing the accumulated hash against a predetermined hash representative of cooperative operation of the first service and the second service in the third network device;
   verifying the integrity of the chain of trusted devices based on the comparison of the accumulated hash against the predetermined hash and by comparing monitored parameters in the third network device related to the cooperative operation of the first service and the second service with predetermined parameters of a federation of the first service and the second service; and
   dynamically adjusting a level of the first service and the second service according to verification of the integrity of the chain of trusted devices.

7. The method of claim 6, wherein the initiation of the authentication of the identity of the first network device and the second network device comprises authentication of the first network device with the authentication server, and authentication of the second network device by the first network device.

8. The method of claim 6, further comprising:
   confirming the cooperative operation of the first service and the second service based on a predetermined stored template of cooperative operation parameters.

9. The method of claim 6, further comprising:
   dynamically retrieving another predetermined stored template of cooperative operation parameters in response to a change of the first service or the second service, or addition of another service to the first network device or the second network device.

10. A non-transitory computer readable medium storing instruction for authenticating an identity of a first network device and a second network device, the first network device executed to provide a first service for a third network device, the second network device executed to provide a second service for the third network device, the first service and the second service provided over a network to the third network device, the instructions when executed by a processor cause the processor to:
   initiate authentication of the identity of the first network device, the second network device, and the third network device, to create a chain of trusted devices in response to the third network device being initiated to operate using the first service and the second service before an integrity of the chain of trusted devices is verified, wherein the initiation of the authentication of the identity of the first network device and the second network device comprises a two factor authentication by an authentication server;
   receive an accumulated hash from the first network device, the accumulated hash sequentially built by cascading a hash sum through the second network device and the first network device;
   compare the accumulated hash against a predetermined hash representative of cooperative operation of the first service and the second service in the third network device;

verify the integrity of the chain of trusted devices based on the comparison of accumulated hash against the predetermined hash and by comparing monitored parameters in the third network device related to the cooperative operation of the first service and the second service with predetermined parameters of a federation of the first service and the second service; and dynamically adjust a level of the first service and the second service according to verification of the integrity of the chain of trusted devices.

11. The non-transitory computer readable medium of claim 10, wherein the initiation of the authentication of the identity of the first network device and the second network device comprises authentication of the first network device with the authentication server, and authentication of the second network device by the first network device.

12. The non-transitory computer readable medium of claim 10, wherein the instructions when executed by the processor further cause the processor to:

confirm the cooperative operation of the first service and the second service based on a predetermined stored template of cooperative operation parameters.

13. The non-transitory computer readable medium of claim 10, wherein the instructions when executed by the processor further cause the processor to:

dynamically retrieve another predetermined stored template of cooperative operation parameters in response to a change of the first service or the second service, or addition of another service to the first network device or the second network device.

\* \* \* \* \*